(12) United States Patent
Kim et al.

(10) Patent No.: US 11,904,709 B2
(45) Date of Patent: Feb. 20, 2024

(54) BATTERY STORAGE DEVICE FOR ELECTRIC VEHICLE

(71) Applicants: HYUNDAI MOTOR COMPANY, Seoul (KR); KIA MOTORS CORPORATION, Seoul (KR)

(72) Inventors: Jin Won Kim, Pyeongtaek-si (KR); Jun Seok Choi, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 427 days.

(21) Appl. No.: 16/890,113

(22) Filed: Jun. 2, 2020

(65) Prior Publication Data

US 2021/0252985 A1    Aug. 19, 2021

(30) Foreign Application Priority Data

Feb. 13, 2020  (KR) ........................ 10-2020-0017840

(51) Int. Cl.
*B60L 50/64*    (2019.01)
*B60K 1/04*     (2019.01)
*B60L 3/00*     (2019.01)
*H01M 50/24*    (2021.01)

(52) U.S. Cl.
CPC ............... *B60L 50/64* (2019.02); *B60K 1/04* (2013.01); *B60L 3/0007* (2013.01); *H01M 50/24* (2021.01); *H01M 2220/20* (2013.01)

(58) Field of Classification Search
None
See application file for complete search history.

(56) References Cited

U.S. PATENT DOCUMENTS

| 2012/0103714 A1* | 5/2012 | Choi | B60L 58/40 |
| | | | 180/68.5 |
| 2015/0228945 A1* | 8/2015 | Maruoka | H01M 50/211 |
| | | | 429/152 |
| 2016/0226117 A1* | 8/2016 | Noh | H01M 10/6566 |
| 2021/0036280 A1* | 2/2021 | Nishimori | H01M 50/249 |

FOREIGN PATENT DOCUMENTS

| EP | 3054359 A1 * | 8/2016 | ............ G04C 10/00 |
| JP | 7002270 B2 * | 1/2022 | ............ H01M 50/20 |
| KR | 10-2015-0068639 A | 6/2015 | |

\* cited by examiner

*Primary Examiner* — Dustin Q Dam
(74) *Attorney, Agent, or Firm* — Morgan, Lewis & Bockius LLP

(57) ABSTRACT

A battery storage device for an electric vehicle includes a reinforcing panel that reduces impact energy and is disposed between a case and a battery module, whereby, when a car collision occurs, the battery module is protected from impact by the reinforcing panel, damage to the battery module is reduced, stability of the vehicle is secured, and manufacturing costs are reduced.

21 Claims, 6 Drawing Sheets

BATTERY STORAGE DEVICE FOR ELECTRIC VEHICLE

CROSS REFERENCE TO RELATED APPLICATION

The present application claims the benefit of priority to Korean Patent Application No. 10-2020-0017840, filed on Feb. 13, 2020 with the Korean Intellectual Property Office, the entire contents of which is incorporated herein by reference.

TECHNICAL FIELD

The present disclosure relates to a battery storage device for an electric vehicle and, more particularly to a battery storage device for an electric vehicle, the battery storage device reducing damage to a battery module by protecting the battery module from impact when a collision occurs.

BACKGROUND

Recently, interest in eco-friendly vehicles has increased due to environmental problems, high oil prices, etc., and various electric vehicles that are driven using electric energy are being developed.

As the electric vehicles, a battery-powered EV, a fuel cell EV that uses a fuel cell as a motor, a hybrid EV that uses both a motor and an engine, etc. are being developed.

In particular, an electric vehicle has a battery module for keeping electric energy and the battery module has several battery cell units in a battery housing. Such a battery module should prevent damage to the battery cell units from external impact.

A plurality of closed cross-sectional structures was applied to a battery housing to protect a battery module from impact in the related art, but this increases manufacturing costs and there are limitations in protecting a battery module from direct impact. Further, simply increasing the thickness to secure a strength of a battery housing causes the problem of an increase in manufacturing costs and weight.

The information disclosed in the Background section above is to aid in the understanding of the background of the present disclosure, and should not be taken as acknowledgement that this information forms any part of prior art.

SUMMARY

The present disclosure has been made in order to solve the above-mentioned problems in the prior art and an aspect of the present disclosure is to provide a battery storage device for an electric vehicle, the battery storage device reducing damage to a battery module by protecting the battery module from impact when a car collision occurs.

In order to achieve the aspects of the present disclosure, a battery storage device for an electric vehicle includes: a case having a side disposed along an edge of the case and having a space for mounting a battery module inside the side; and a reinforcing panel disposed between the side of the case and the battery module, mounted and fixed to the battery module, and having at least one or more reinforcing members to reduce impact energy in a collision.

The reinforcing panel may include: a vibration absorption part having an inner side facing the battery module, extending along the battery module, and having an elastic material that absorbs impact energy; and a panel part disposed to face an outer side of the vibration absorption part, coupled to the vibration absorption part through several connecting members, extending along the vibration absorption part, and including a rigid material.

Several recessed fastening holes may be formed on the inner side of the vibration absorption part so that the connecting members are inserted therein, and the connecting members may be inserted in the fastening holes from the inner side of the vibration absorption part and fastened through the panel part.

Portions through which the connecting members pass may be recessed inward on an outer side of the panel part, so the connecting members may not protrude from the outer side of the panel part.

The vibration absorption part may be coupled to the battery module by bonding the inner side of the vibration absorption part to the battery module.

Fastening members extending toward the battery module through the vibration absorption part may be disposed at an upper end of the panel part, and the panel part and the battery module may be coupled by the fastening members.

Recessions that are recessed downward may be formed at positions corresponding to the fastening members on an upper end of the vibration absorption part.

The upper end of the panel part may bend and extend inward and several chamfered portions recessed outward may be disposed to be spaced apart from each other at the upper end of the panel part in the longitudinal direction of the panel part.

Several reinforcing bead portions protruding and extending up and down may be disposed at portions, where the connecting members are not fastened, on the outer side of the panel part, and may be spaced apart from each other in a longitudinal direction of the panel part.

Shock-absorbing pads may be disposed on outer sides of an upper portion and a lower portion of the panel part and may extend in a longitudinal direction of the panel part.

The battery storage device for an electric vehicle includes a reinforcing panel that reduces impact energy disposed between a case and a battery module, whereby, when a car collision occurs, the battery module is protected from impact by the reinforcing panel, damage to the battery module is reduced, stability of the vehicle is secured, and manufacturing costs are reduced.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

A battery storage device for an electric vehicle according to exemplary embodiments of the present disclosure is described hereafter with reference to the accompanying drawings.

Figure 1:
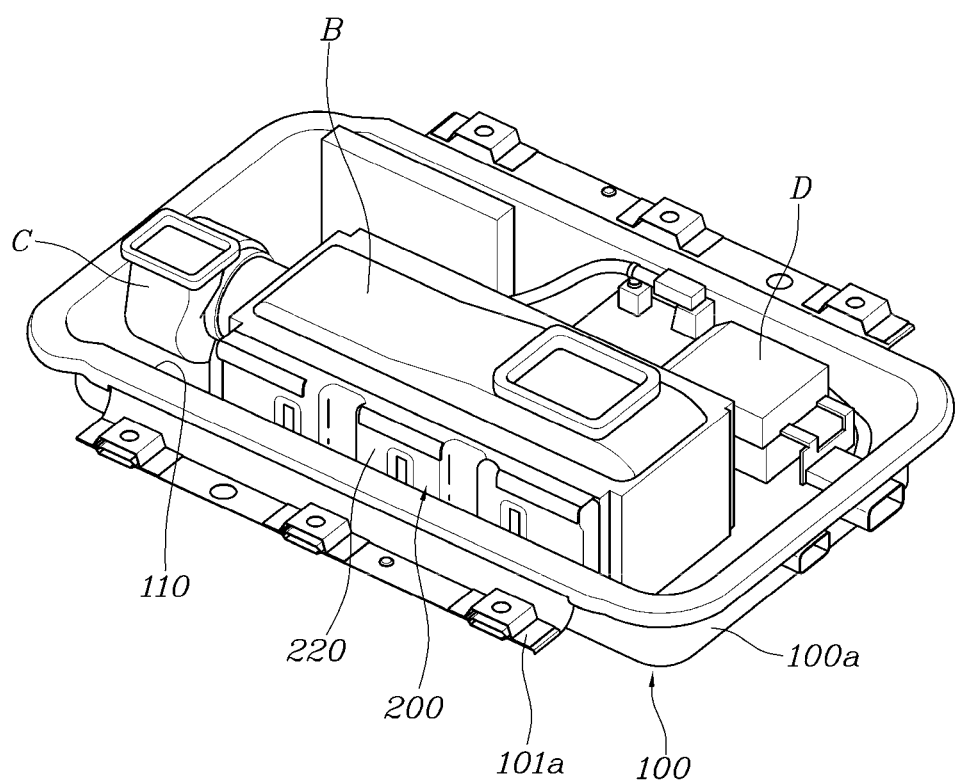
FIG. 1 is a view showing a battery storage device for an electric vehicle according to an exemplary embodiment of the present disclosure.
Figure 2:
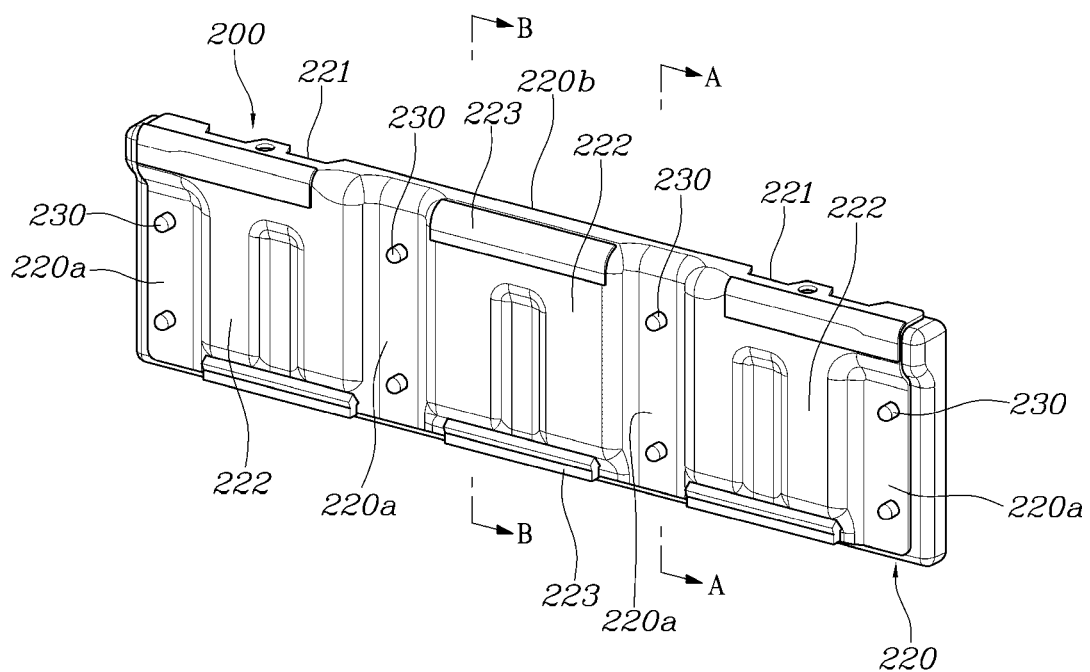
FIGS. 2 to 3 are views showing a reinforcing panel of the battery storage device for an electric vehicle shown in FIG. 1.
Figure 3:
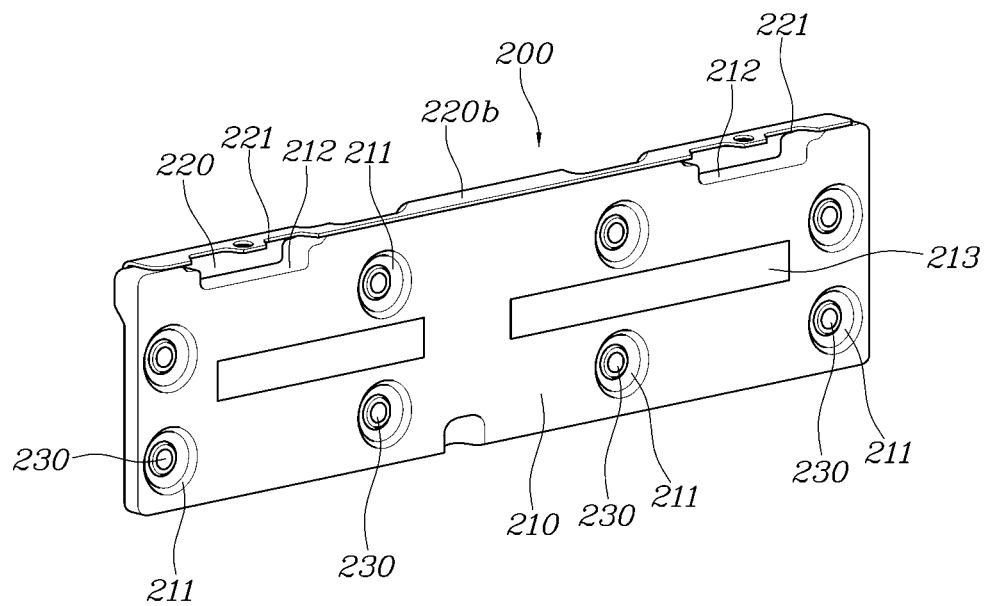
Figure 4:
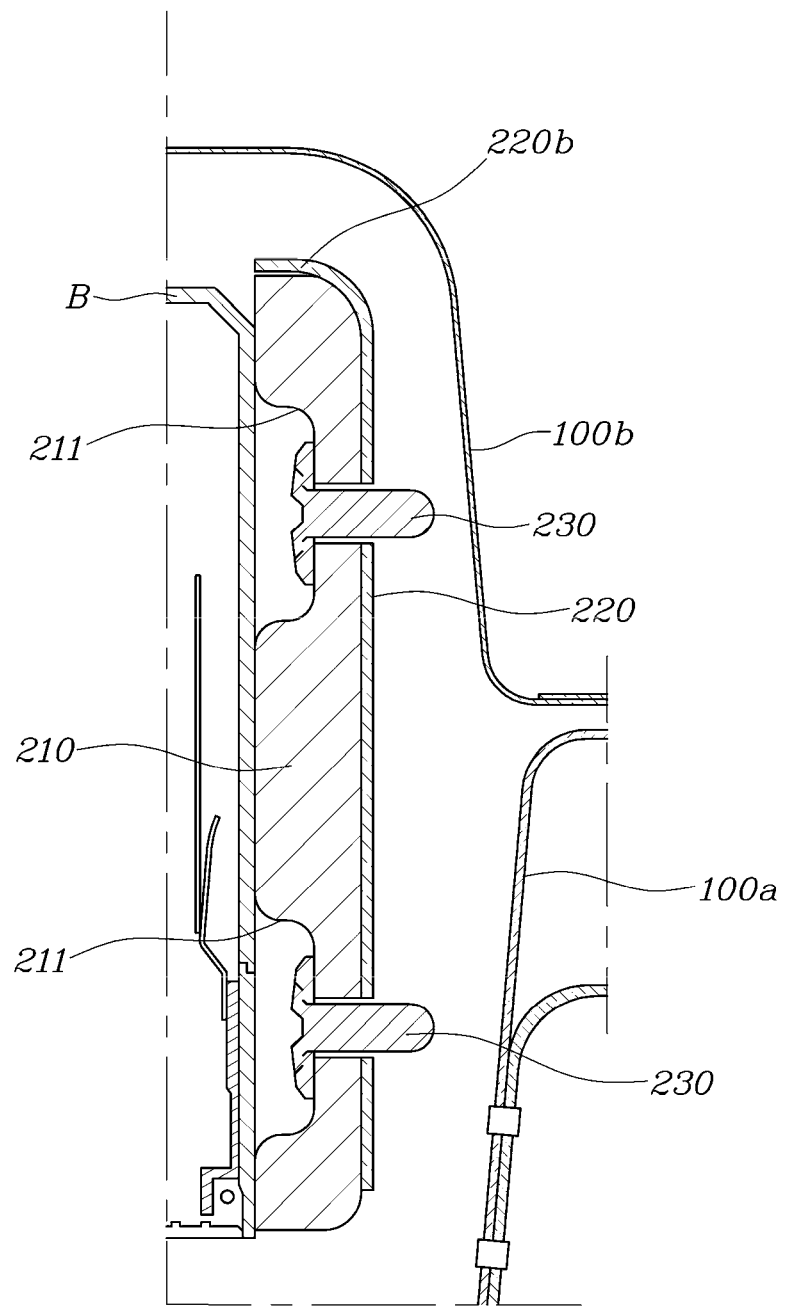
FIG. 4 is a cross-sectional view taken along line A-A' of the battery storage device for an electric vehicle shown in FIG. 2.
Figure 5:
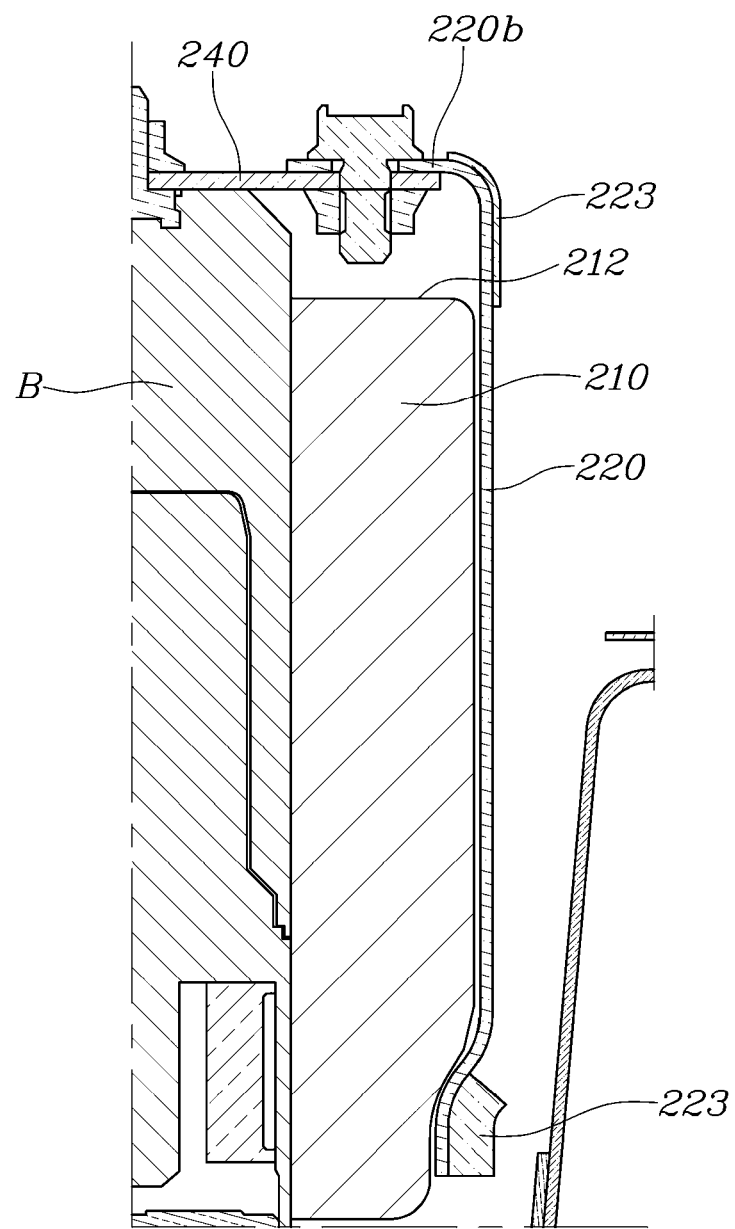
FIG. 5 is a cross-sectional view taken along line B-B' of the battery storage device for an electric vehicle shown in FIG. 2.
Figure 6:
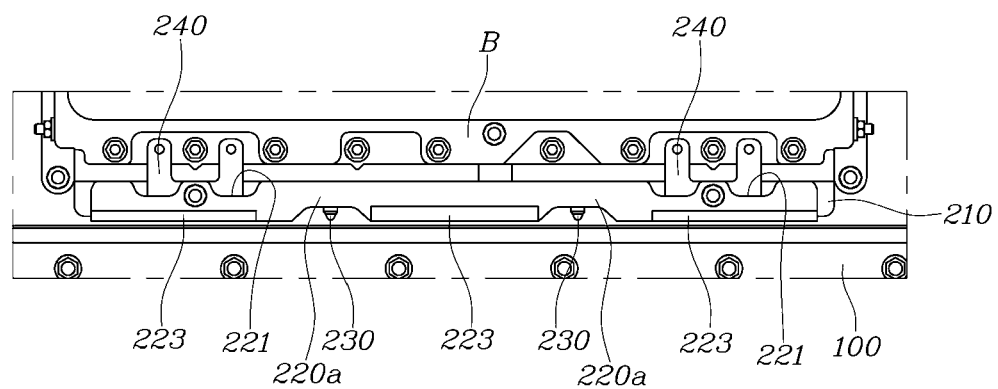
FIG. 6 is a view showing the battery storage device for an electric vehicle shown in FIG. 1.

FIG. 1 is a view showing a battery storage device for an electric vehicle according to an exemplary embodiment of the present disclosure, FIGS. 2 to 3 are views showing a reinforcing panel of the battery storage device for an electric vehicle shown in FIG. 1, FIG. 4 is a cross-sectional view taken along line A-A' of the battery storage device for an electric vehicle shown in FIG. 2, FIG. 5 is a cross-sectional view taken along line B-B' of the battery storage device for an electric vehicle shown in FIG. 2, and FIG. 6 is a view showing the battery storage device for an electric vehicle shown in FIG. 1.

A battery storage device for an electric vehicle according to an exemplary embodiment of the present disclosure, as shown in FIG. 1, includes: a case 100 having a side 110 disposed along the edge and having a space for mounting a battery module B inside the side 110; and a reinforcing panel 200 disposed between the side 110 of the case 100 and the battery module B, mounted and fixed to the battery module B, and having at least one or more reinforcing members 250 to reduce impact energy in a collision.

The case 100, as can be seen in FIG. 1, may include an upper case 100b and a lower case 100a, in which the lower case 100a has the side 110 disposed along the edge thereof, has the space for mounting the battery module B inside the side 110, and has a coupling end 101a on the outer side for coupling to a car body. Not only the battery module B, but also a cooler C and various electronic devices D may be disposed in the lower case 100a and the coupling end 101a is disposed on the outer side of the lower case 100a, so it is possible to mount the lower case 100a on a car body by bolting the coupling end 101a to the car body. The upper case 100b is coupled to the top of the lower case 100a, whereby the space of the lower case 100a is closed.

The case 100 of the present disclosure may be mounted outside the bottoms of the front sheets of a vehicle and may be mounted to the lower end of a passenger seat. In the following description of the present disclosure, the case 100 may be the lower case 100a and the term 'case 100' is generally used.

On the other hand, there is provided the reinforcing panel 200 disposed between the side 110 of the case and the battery module B and mounted and fixed to the battery module B. The reinforcing panel 200 includes at least one or more reinforcing members 250 to attenuate impact energy in a collision. That is, the reinforcing panel 200 includes one or more reinforcing members 250 that can attenuate impact energy, and, in a car collision, the reinforcing panel 200 attenuates impact energy so that the impact energy is not directly transmitted to the battery module B, thereby minimizing damage to the battery module B. Since the reinforcing panel 200 is disposed between the side 110 of the case 100 and the battery module B, a strength of the case 100 increases. Further, since the reinforcing panel 200 absorbs and attenuates impact energy that is transmitted to the battery module B, whereby damage to the battery module B is prevented.

As described above, since the reinforcing panel 200 is provided in the present disclosure, damage to the battery module B is prevented in a car collision, whereby stability is improved.

In more detail, according to an exemplary embodiment of the present disclosure, as shown in FIGS. 2 and 3, the reinforcing panel 200 includes several reinforcing members 250 and each of the reinforcing members 250 may include: a vibration absorption part 210 disposed with the inner side facing the battery module B, extending along the battery module B, and including an elastic material that absorbs impact energy; and a panel part 220 disposed to face the outer side of the vibration absorption part 210, coupled to the vibration absorption part 210 through several connecting members 230, extending along the vibration absorption part 210, and including a rigid material.

The vibration absorption part 210 may include a material that can absorb impact energy such as rubber, polyurethane, and silicon, and the panel part 220 may include a rigid material such as steel. The vibration absorption part 210 is disposed with the inner side facing the battery module B and with the outer side coupled to the connecting members 230, and extends along the battery module B, thereby absorbing impact energy that is transmitted to the battery module B. The panel part 220 is disposed with the inner side facing the vibration absorption part 210 and the outer side facing the outside, is coupled to the vibration absorption part 210 through the connecting members 230, and extends along the battery module B, thereby protecting the battery module B from direct hitting. In this configuration, the connecting members 230 may be fasteners or bolts.

As described above, by having the reinforcing panel 200, when a car collision occurs, the panel part 220 protects the battery module B from direct impact and the vibration absorption part 210 absorbs and attenuates impact energy, thereby protecting the battery module B from impact. Accordingly, even in a car collision, damage to the battery module B is prevented and stability is improved.

Furthermore, as shown in FIGS. 4 and 5, several recessed fastening holes 211 are formed on the inner side of the vibration absorption part 210 so that the connecting members 230 are inserted therein, and the connecting members 230 can be inserted in the fastening holes 211 from the inner side of the vibration absorption part 210 and fastened through the panel part 220.

Accordingly, the connecting member 230 are inserted and seated in the fastening holes 211 recessed on the inner side of the vibration absorption part 210 even though they are fastened to the inner side of the vibration absorption part 210, so they do not protrude from the inner side of the vibration absorption part 210. That is, the inner side of the vibration absorption part 210 is disposed in contact with the battery module B. Accordingly, if the connecting members 230 protrude from the vibration absorption part 210, the battery module B may be damaged due to contact between the connecting members 230 and the battery module B. Further, a gap is formed between the vibration absorption part 210 and the battery module B, so attenuation of impact energy by the vibration absorption part 210 may not be performed well. Accordingly, the fastening holes 211 are recessed on the inner side of the vibration absorption part 210, so the connecting members 230 inserted in the fastening holes 211 can be held without protruding from the inner side of the vibration absorption part 210.

Further, since the connecting members 230 pass through the fastening holes 211 and the panel part 220 from the inner side of the vibration absorption part 210, the vibration absorption part 210 and the panel part 220 are coupled to each other without the tips of the connecting members 230 facing the battery module B.

Accordingly, the vibration absorption part 210 and the panel part 220 are coupled to each other by the connecting members 230 and the connecting members 230 are not in contact with the battery module B, so damage to the battery module B by the connecting members 230 is prevented.

On the other hand, as shown in FIG. 3, the portions 220a through which the connecting members 230 pass, of the outer side of the panel part 220, are recessed inward, thereby preventing the connecting members 230 from protruding outward.

Since the connecting members 230 are fastened to the portions recessed inward of the outer side of the panel part 220, they do not protrude from the outer side of the panel part 220, and, in a car collision, direct impact is not applied to the connecting members 230, so separation of the connecting members 230 is prevented. Further, in the panel part 220, the recessed shapes at the portions 221 through which the connecting members 230 pass are repeated in the longitudinal direction, so strength is secured.

The vibration absorption part 210 may be coupled to the battery module B by bonding the inner side to the battery module B. Since the inner side of the vibration absorption part 210 is bonded to the battery module B and the coupled state is maintained, impact energy that is transmitted to the battery module B can be attenuated by the vibration absorption part 210. To this end, bonding portions 231 to which an adhesive is applied are provided on the inner side of the vibration absorption part 210, so the vibration absorption part 210 and the battery module B can be coupled to each other by the bonding portions 213. The bonding portions 213, as shown in FIG. 4, may longitudinally extend on the inner side of the vibration absorption part 210.

A fastening member 240 extending toward the battery module B through the vibration absorption part 210 is disposed at the upper end 220b of the panel part 220, so the panel part 220 and the battery module B can be coupled by the fastening member.

As shown in FIG. 6, the fastening member 240 is provided to couple the upper end of the panel part 220 and the battery module B, and may be fixed by bolting. Several fastening members 240 may be provided and disposed at the upper ends of both ends of the panel part 220. The panel part 220 is smaller in size than the battery module B, so the panel part 220 is coupled to the battery module B by the fastening member on the upper end.

Moreover, a recession 212 that is recessed downward may be formed at a position corresponding to the fastening member 240 on the upper end of the vibration absorption part 210. As shown in FIG. 4, the recession 212 is formed at a position corresponding to the fastening member 240 on the upper end of the vibration absorption part 210, so interference between the vibration absorption part 210 and the fastening member 240 coupled to the panel part 220 is avoided.

The upper end of the panel part 220 may bend and extend inward and several chamfered portions 221 recessed outward may be formed and spaced apart from each other at the upper end in the longitudinal direction of the panel part 220. As the chamfered portions 221 are formed, the weight of the panel part 220 decreases, and the chamfered portions 221 may be formed at positions where the fastening members 240 are fastened. The upper end of the panel part 220 that bends and extends inward is positioned over the battery module B so that the upper end of the panel part 220 does not hit against the battery module B in a car collision.

Further, as shown in FIG. 3, several reinforcing bead portions 222 protruding and extending up and down are formed at portions, where the connecting members 230 are not fastened, on the outer side of the panel part 220, and may be spaced apart from each other in the longitudinal direction of the panel part 220.

Since several reinforcing bead portions 222 extending up and down are formed on the outer side of the panel part 220, strength of the panel part 220 increases. The several reinforcing bead portions 222 are spaced apart from each other in the longitudinal direction of the panel part 220 and some of the reinforcing bead portions 222 may be connected to each other. As shown in FIG. 3, the reinforcing bead portions 222 may be formed in pairs by connecting the upper ends in ∩-shapes. Since the several reinforcing bead portions 222 are formed on the panel part 220 and are connected in pairs, the entire strength is secured.

On the other hand, as shown in FIG. 7, shock-absorbing pads 223 are disposed on the outer sides of the upper portion and the lower portion of the panel part 220, and the shock-absorbing pads 223 may extend in the longitudinal direction of the panel part 220.

The shock-absorbing pads 223 are provided to absorb impact energy that is transmitted to the battery module B in a car collision, and are disposed on the outer sides of the upper portion and the lower portion of the panel part 220 to reduce vibration and noise that are generated when a vehicle is driven. That is, if the panel part 220 of the reinforcing panel 200 is in contact with the case 100, noise may be generated while a vehicle is driven, so the shock-absorbing pads 223 absorb fine impact and vibration that are transmitted through the case 100. Since the shock-absorbing pads 223 are disposed on the panel part 220 of the reinforcing panel 200 and reduce vibration and noise, stability of the battery module B is increased.

As described above, according to some exemplary embodiments of the present disclosure, since the reinforcing panel 200 is disposed between the battery module B and the case 100, the battery module B is protected from impact when a collision occurs. That is, the reinforcing panel 200 supports the coupling portion of the case 100 or the coupling portion between the case 100 and a car body that is pushed toward the battery module B by the collision, so damage to the battery module B is prevented, whereby stability of the battery module B is secured.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A battery storage device for an electric vehicle, comprising:
   a lower case having a bowl shape with an open upper side and a space for accommodating a battery module; and
   a reinforcing panel disposed between a side of the lower case and the battery module, mounted and fixed to the battery module, and having at least one or more reinforcing members to reduce impact energy in a collision,
   wherein the reinforcing panel includes:
   a vibration absorption part comprising an inner side facing the battery module, extending along the battery module, and including an elastic material that absorbs impact energy; and
   a panel part disposed to face an outer side of the vibration absorption part, coupled to the vibration absorption part through connecting members, extending along the vibration absorption part, and including a rigid material, and wherein the vibration absorption part includes recessed portions recessed from the inner side of the vibration absorption part and fastening holes formed on the respective recessed portions, and the connecting members are inserted into the respective fastening holes.

2. The battery storage device of claim 1, wherein portions through which the connecting members pass are recessed inward on an outer side of the panel part, so the connecting members do not protrude from the outer side of the panel part.

3. The battery storage device of claim 1, wherein the panel part is mechanically coupled to the battery module by fastening members, and the vibration absorption part is coupled to the battery module with an adhesive.

4. The battery storage device of claim 1, wherein an upper end of the panel part bends and extends inward, and
chamfered portions recessed outward are disposed to be spaced apart from each other at the upper end of the panel part in a longitudinal direction of the panel part.

5. The battery storage device of claim 1, wherein reinforcing bead portions protruding and extending up and down are disposed at portions, where the connecting members are not fastened, on an outer side of the panel part, and are spaced apart from each other in a longitudinal direction of the panel part.

6. The battery storage device of claim 1, wherein shock-absorbing pads are disposed on outer sides of an upper portion and a lower portion of the panel part and extend in a longitudinal direction of the panel part.

7. The battery storage device of claim 1, wherein an upper end of the panel part bends and extends inward, and is positioned over the battery module.

8. The battery storage device of claim 3, wherein the panel part and the battery module are directly coupled by the fastening members without any portion of the vibration absorption part being intervened therebetween.

9. A battery storage device for an electric vehicle, comprising:
a lower case having a bowl shape with an open top by bending side portions of the lower case in a vertical direction and a space for accommodating a battery module;
an upper case located on an upper part of the lower case, having a bowl shape with an open bottom by bending side portions of the upper case in the vertical direction and a space for accommodating the battery module;
coupling ends being formed by horizontally bending end portions of the side portions of the upper case and the lower case to face each other, and being coupled to seal the spaces for accommodating the battery module inside the upper case and the lower case;
a reinforcing panel disposed between a side of the lower case and the battery module, mounted and fixed to the battery module, and having at least one or more reinforcing members to reduce impact energy in a collision,
wherein the reinforcing panel includes:
a vibration absorption part comprising an inner side facing the battery module, extending along the battery module, and including an elastic material that absorbs impact energy; and
a panel part disposed to face an outer side of the vibration absorption part, coupled to the vibration absorption part through connecting members, extending along the vibration absorption part, and including a rigid material,
wherein the reinforcing panel is mechanically coupled to the battery module at the top of the panel part by fastening members, and
wherein the connecting members do not overlap with the coupling ends of the upper case and the lower case in a horizontal direction.

10. The battery storage device of claim 9, wherein the vibration absorption part includes recessed portions recessed from the inner side of the vibration absorption part and fastening holes formed on the respective recessed portions of the vibration absorption part so that the connecting members are inserted therein, and
the connecting members are inserted in the fastening holes from the inner side of the vibration absorption part and fastened through the panel part.

11. The battery storage device of claim 10, wherein portions through which the connecting members pass are recessed inward on an outer side of the panel part, so the connecting members do not protrude from the outer side of the panel part.

12. The battery storage device of claim 9, wherein the vibration absorption part is coupled to the battery module by bonding the inner side of the vibration absorption part to the battery module.

13. The battery storage device of claim 9, wherein the fastening members extending toward the battery module through the vibration absorption part are disposed at an upper end of the panel part.

14. The battery storage device of claim 13, wherein recessions that are recessed downward from an upper end of the vibration absorption part and are formed at positions corresponding to the respective fastening members.

15. The battery storage device of claim 13, wherein an upper end of the panel part bends and extends inward, and
chamfered portions recessed outward are disposed to be spaced apart from each other at the upper end of the panel part in a longitudinal direction of the panel part.

16. The battery storage device of claim 9, wherein reinforcing bead portions protruding and extending up and down are disposed at portions, where the connecting members are not fastened, on an outer side of the panel part, and are spaced apart from each other in a longitudinal direction of the panel part.

17. The battery storage device of claim 9, wherein shock-absorbing pads are disposed on outer sides of an upper portion and a lower portion of the panel part and extend in a longitudinal direction of the panel part.

18. The battery storage device of claim 9, wherein the panel part and the battery module are directly coupled by the fastening members without any portion of the vibration absorption part being intervened therebetween.

19. The battery storage device of claim 3, wherein recessions that are recessed downward from an upper end of the vibration absorption part and are formed at positions corresponding to the respective fastening members.

20. The battery storage device of claim 19, wherein bottom surfaces of the recessions of the vibration absorption part are spaced apart from the fastening members.

21. The battery storage device of claim 14, wherein bottom surfaces of the recessions of the vibration absorption part are spaced apart from the fastening members.

* * * * *